(No Model.)

W. FAHRIG.
ICE VELOCIPEDE.

No. 529,371. Patented Nov. 20, 1894.

Witnesses:
Chas. E. Gaylord
Lute D. Alter

Inventor:
William Fahrig,
By Banning & Banning & Sheridan,
Attys

UNITED STATES PATENT OFFICE.

WILLIAM FAHRIG, OF CHICAGO, ILLINOIS.

ICE-VELOCIPEDE.

SPECIFICATION forming part of Letters Patent No. 529,371, dated November 20, 1894.

Application filed January 23, 1894. Serial No. 497,751. (No model.)

*To all whom it may concern:*

Be it known that I, WILLIAM FAHRIG, a citizen of the United States, residing at Chicago, Cook county, Illinois, have invented certain new and useful Improvements in Ice-Velocipedes, of which the following is a specification.

The object of my invention is to provide a simple, economical, and efficient attachment for bicycles, which will convert them into a machine adapted to be propelled along snow and ice; and my invention consists in the features, arrangements and details of construction hereinafter described and claimed.

Figure 1:
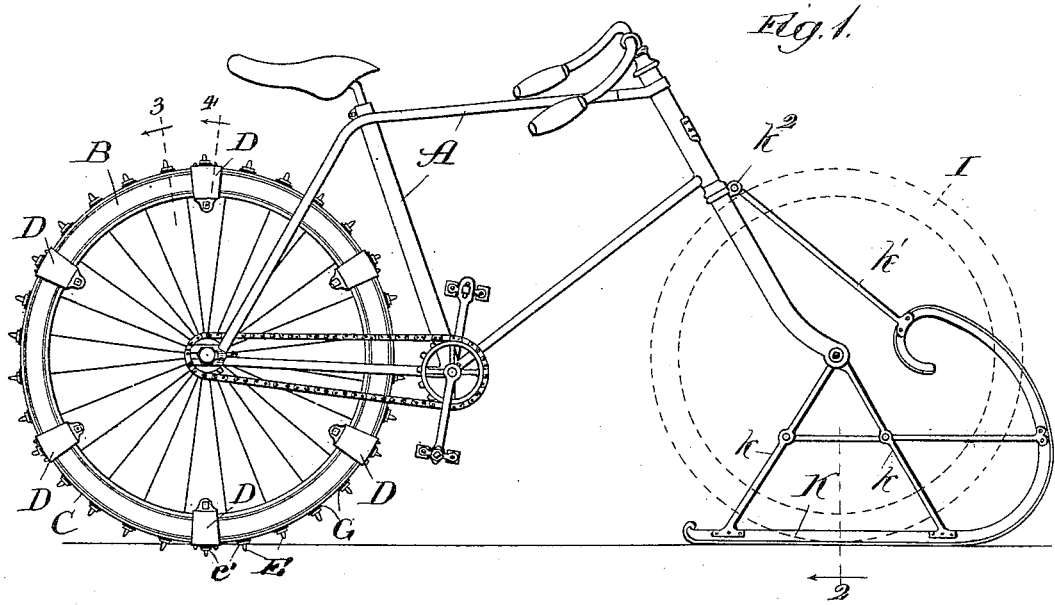
Figure 2:
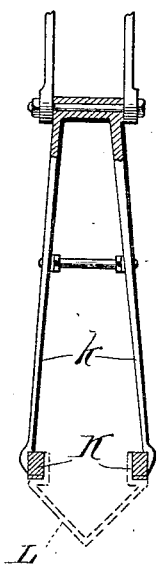
Figure 4:
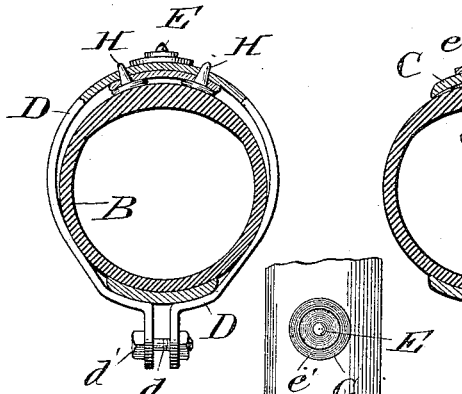
Figure 3:
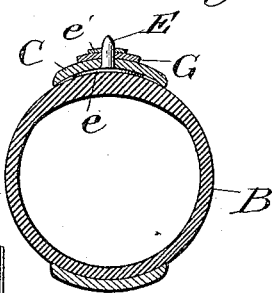
Figure 5:
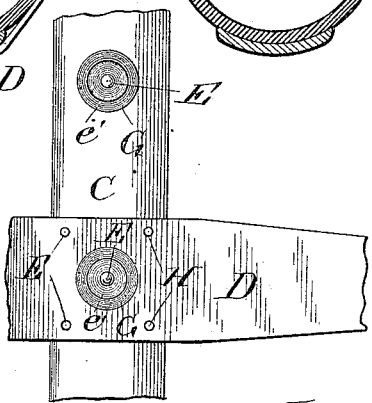

In the drawings, Figure 1 is a front elevation of my attachments as applied to the style of bicycle known as the safety type; Fig. 2, a section of a portion of my improvement, taken on line 2 of Fig. 1; Fig. 3, an enlarged sectional view taken on line 3 of Fig. 1; Fig. 4, an enlarged sectional view, taken on line 4 of Fig. 1; and Fig. 5 an enlarged detail hereinafter described.

The design of my invention is to provide a simple and efficient mechanism, which may be applied to the rear or driving wheel of a bicycle and inclose the pneumatic or cushioned tire, in such manner as to get the benefit of its elasticity and at the same time protect it from the jagged edges of the ice or frozen snow, and having spike mechanism secured to it, so that during its revolution it will get sufficient purchase in the snow or ice to propel the vehicle along.

It consists further in providing a set of runners adapted to be attached to the front fork of the bicycle, and to a certain extent sustain the weight of the rider and be used as steering apparatus for the vehicle; and it consists finally in the method of securing the spikes to the sheet metallic covering which serves to propel the vehicle along.

In constructing my improvement, I use any of the common types of bicycle frames A—preferably the safety form—having the usual crank, sprocket and chain mechanism for imparting rotation to the rear or driving wheel, B. I secure to this rear driving wheel, a metallic strip, C, extending around the entire outer circumference of the tire, and having its edges joined together in any suitable manner. This strip is secured to the wheel by means of the clips, D, which extend around the tire and have their free ends bolted together, as at $d$, in such manner that when it is desired to remove the sheet metal outer covering from the tire or replace it thereon, the bolts, $d'$, are removed, and the clip, D—being preferably made of spring steel—assumes the position shown in Fig. 5, so that the sheet metal covering can be easily removed or replaced and applied to any bicycle desired. To furnish projecting spurs or spikes for obtaining the necessary purchase in the ice or snow, and secure them to the outer metallic covering, I provide spikes, E, having a flanged head, $e$, on the inner side, and resting preferably on the cushioned portion of the tire. The spike extends outwardly the required distance, and is provided with a metallic washer, $e'$, which is soldered to it, or connected rigidly with it in any desired manner. Interposed between this washer and the sheet metal covering is a cushioned washer, G, so arranged that it forms a cushioning device or buffer for the spike as it strikes a hard obstruction, and allows it to yield, but at the same time prevents it from being pushed in too far on the cushioning portion of the tire proper. The advantages of this construction are that sudden shocks, on striking hard objects, will not tend to loosen the spikes and drive them into the cushioned portion of the tire, thereby destroying the same.

To attach the clips to the sheet metal outer covering, I provide dowel pins, H, preferably four in number, and either insert them loosely or rigidly—as may be desired—in the sheet metal rim. The clips are provided with holes, through which the dowels protrude, and which act in a certain sense as projecting spurs to assist in obtaining the necessary purchase to propel the vehicle along.

In order to sustain the weight of the rider and provide the necessary steering mechanism, I remove the front wheel, I, shown in dotted lines in Fig. 1, and in its place secure to the front forks of the bicycle, at the axle portion, a pair of runners, K, which have the ordinary brace rods, $k$, connecting them to the front forks and with each other. A pair of brace rods, $k'$, connect the front portion of the runners with the ordinary brake bracket, $k^2$, of the front fork, so as to give the necessary rigidity to the runners and enable them to be steered easily. The runners alone will furnish sufficient bearing surfaces on the ordinary snow, but if it be desired to use the same on the smooth, hard ice of lakes or ponds, I provide a sharp V-shaped runner, L, shown particularly in Fig. 2, which may be secured to the runner proper by means of bolts or in any desired manner. This runner proper will only extend along a portion of the lower surface, or as much as may be desired.

I have not described fully the entire structure of the frame, which forms no essential part of my invention, as any style of bicycle frame, handle bars, &c., may be used, which are all so well known to those skilled in the art that any detailed description of them here would be superfluous.

I claim—

1. In ice velocipedes, the combination of a bicycle frame, a driving wheel provided with a cushioned tire, a sheet metal outer covering for such tire, a series of independent cushioned spikes attached to such covering, a set of spring metal clips for securing such covering and wheel rim together, and a set of runners secured to the front fork of the bicycle frame, substantially as described.

2. In ice velocipedes, the combination of a driving wheel adapted to be attached to a bicycle frame, a sheet metal strip forming an outer covering for the cushioned tire, and a series of independent cushioned spikes attached to such covering consisting of a headed spike on the inner side, a metal washer rigidly attached to the outside, and a cushioned washer interposed between such outer washer and the metallic covering, substantially as described.

3. In ice velocipedes, the combination of a driving wheel adapted to be attached to a bicycle frame, a sheet metal strip forming an outer covering for the cushioned tire, a series of independent cushioned spikes attached to such covering consisting of a headed spike on the inner side, a metal washer rigidly attached to the outside, and a cushioned washer interposed between such outer washer and the metallic covering, and a set of spring metal clips for securing such wheel and covering together, substantially as described.

WILLIAM FAHRIG.

Witnesses:
THOMAS F. SHERIDAN,
SAMUEL E. HIBBEN.